Nov. 6, 1962  J. K. LYON, JR  3,062,330
ADJUSTABLE SHOCK ABSORBER SYSTEM FOR VEHICLES
Filed May 9, 1960
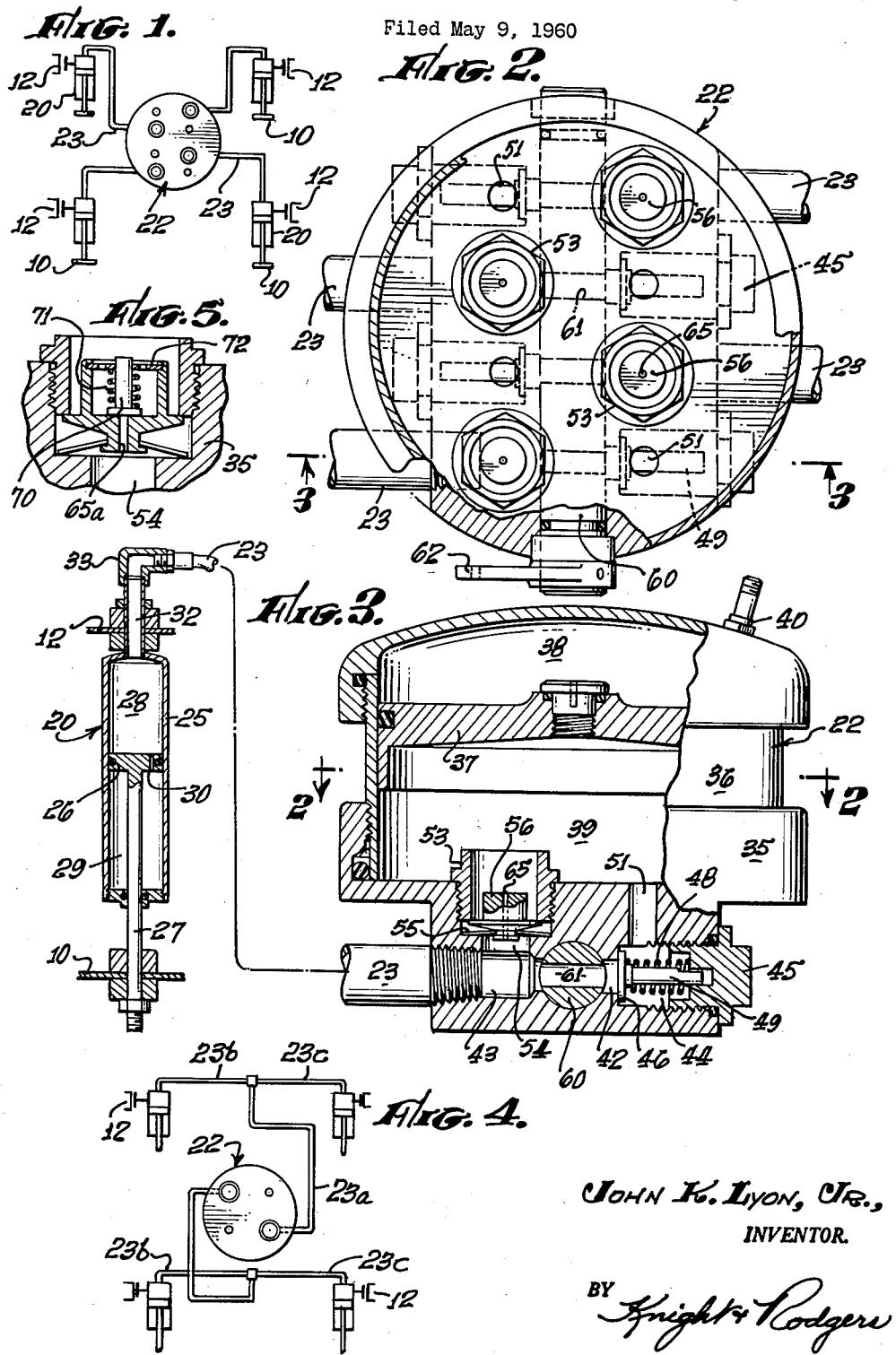
JOHN K. LYON, JR.,
INVENTOR.
BY Knight & Rodgers
ATTORNEYS.

United States Patent Office 3,062,330
Patented Nov. 6, 1962

3,062,330
ADJUSTABLE SHOCK ABSORBER SYSTEM
FOR VEHICLES
John K. Lyon, Jr., 1176 Afton St., Pasadena, Calif.
Filed May 9, 1960, Ser. No. 27,902
10 Claims. (Cl. 188—87)

The present invention relates generally to suspension systems for automotive vehicles, and more especially to hydraulic shock absorbers which can be adjusted at will in order to change the riding characteristics of the vehicle. The present invention has been particularly designed for use with pleasure-type automobiles, but it will be understood that in its broader aspect the invention is not limited to any particular type of vehicle.

It is old and well known to provide motor vehicles with springs interposed between the body and the wheels in order to absorb shocks imparted to the vehicle by unevenness in the road surface. The body and other elements of the vehicle which are supported on and by the springs are commonly referred to as the sprung mass, while the wheels and axles and minor attached members upon which the springs are supported, are referred to as the unsprung mass. The purpose of the springs is to allow relative vertical movement between these two masses of the vehicles and to improve the riding or comfort characteristics of the vehicle.

If the springs are made relatively stiff and unyielding, the characteristics of the ride produced by them may be described as "hard." This is because the springs transmit to the body and to the people riding in it a relatively large proportion of the shock received from inequalities of the road surface. Consequently stiff springs are comfortable only when the road is comparatively smooth. The widespread and understandable demand for comfort by vehicle owners has resulted in most pleasure-type vehicles being originally equipped with springs which are comparatively flexible or yielding, the ride produced by such springs being described as "soft." Because of this more yielding nature of the springs, there is now much more relative movement between the wheels and the body; and, as the amount of shock transmitted to the body is substantially decreased; there is a greater degree of comfort. It becomes necessary to control the rebound action of soft springs with shock absorbers which, after extreme initial compression of the springs, prevent the return or rebound movement from being too violent. Shock absorbers serve to damp the vibrations of the springs and thereby steady the body. The action of shock absorbers inevitably places some limitation upon the degree of comfort which can be obtained, although in other respects they improve the riding comfort by their damping action.

A high degree of riding comfort is usually secured at the expense of other valuable characteristics. Flexibility in springs reduces the degree of control that they exert over the position of the body and allows the body to tilt sideways when the vehicle turns, especially at sharp corners. Also they permit the body to dip down in front when the brakes are suddenly applied or to rise up in front under rapid acceleration. Excessive movement of the sprung mass with respect to the wheels of the vehicle can be very dangerous since it can produce skidding on turns and loss of control of the vehicle by the driver when traveling at high speeds, even on a straight road. As a result, it may be dangerous to drive a car having soft springs over a relatively rough road or around sharp corners, unless the speed of the vehicle is adequately reduced. Shock absorbers of conventional design can control this situation by stabilizing the position of the body over the wheels but do so at the expense of riding comfort, especially when the maximum degree of control is exerted by the shock absorbers.

Shock absorbers and springs operating as a system can be designed and engineered to meet satisfactorily a given set of conditions, for example, road roughness, vehicle loading, speed, and the like. However, they operate at their best within only a relatively narrow range of conditions and they do not have inherent flexibility to meet all conditions which may be encountered by many vehicles, unless some provision is made for adjustment in their operation. Various attempts have been made to improve the action of shock absorbers or ride stabilizing systems by providing some means for adjusting their operation. The general purpose has been to make a system which provides comfortable riding qualities at slow speeds and over smooth roads and yet which can be adjusted to effect an increase in the degree of control which is exercised over the body movement, when necessary. The result is of course an increase in the range of satisfactory operation of the suspension system since it can be adjusted to exert a higher degree of control when road conditions require that the comfort factor be ignored. Adjustable systems of known types have not been widely adopted on motor vehicles for various reasons. One obvious reason has been that many of them are relatively complicated and thus add considerably to the cost of the suspension system as compared to one without an adjustable characteristic. Other designs have not been especially reliable or have been difficult to maintain in satisfactory mechanical condition.

Thus it is a general object of my invention to provide a hydraulic fluid type, shock-absorbing and ride-stabilizing system for an automotive vehicle or the like which includes means for adjusting quickly and effectively the degree of control exerted over the vehicle body by the system.

It is a further object of my invention to provide a hydraulic fluid type, shock-absorbing and ride-stabilizing system of this character in which the change in the degree of control is effected by a single member which simultaneously regulates fluid flow with respect to a plurality of shock absorber units.

A further object of my invention is to provide a shock-absorbing and ride-stabilizing system of this character which has to a high degree all of the advantages obtainable from a system of this character and adjusting the character of the ride obtained to accommodate different types of road surfaces, yet which is simplified and has comparatively few parts, thus making it relatively inexpensive to manufacture, reliable in operation, and simple to service and maintain.

These advantages of my invention have been attained in a hydraulic shock absorber and ride-stabilizing system for a vehicle having a plurality of shock absorbers, each having a cylinder and a piston reciprocable therein and dividing the interior of the cylinder into two separate chambers each filled with hydraulic fluid, and passage means extending between the two chambers of each cylinder for transfer of fluid between the two chambers at a restricted rate of flow, by providing an accumulator, conduit means connecting the cylinders with the accumulator, relief valve means in the conduit means independently regulating flow of hydraulic fluid from each cylinder into the accumulator, replenishing valve means in the conduit means permitting flow of said hydraulic fluid out of the accumulator and into the cylinder, and adjustable valve means in said conduit means movable to regulate simultaneously the flow of hydraulic fluid from all cylinders into the accumulator. In a preferred form of the invention, the conduit means consists of a separate conduit from each cylinder to the accumulator with separate relief and replenishing valves for the conduit means. In a simplified form, the front and rear pairs of shock absorbers are connected to branches of a single conduit which is similarly provided with relief and replenishing valves.

How the above objects and advantages of my invention, as well as others not specifically referred to herein, are attained will be more readily understood by reference to the following description and to the annexed drawing, in which:

FIG. 1 is a diagrammatic view of an installation of a preferred embodiment of my invention in which each of the cylinders is connected to the accumulator by a separate conduit.

FIG. 2 is a horizontal section through the accumulator on line 2—2 of FIG. 3 above the valve structure contained in the base of the accumulator.

FIG. 3 is a vertical median section through a single shock absorber unit and also at an enlarged scale through the accumulator and the valve structure.

FIG. 4 is a diagrammatic view similar to FIG. 1 of a variational form of the invention.

FIG. 5 is a fragmentary view similar to FIG. 4 showing a variational form of valve arrangement.

Referring now to FIGS. 1 and 3, there is indicated diagrammatically at 10 a member which may be a portion of a wheel-mounting assembly, in the case of individually sprung wheels, or a bracket mounted on an axle of a vehicle in the case of a vehicle in which the wheels are mounted in pairs on an axle structure. The wheels are not shown in the drawing. There is indicated diagrammatically at 12 a member which may be a bracket or a portion thereof attached to the frame of the vehicle. The wheels and their mounting assemblies, or the axles, as the case may be, are included in the unsprung mass of the vehicle. The frame 12, together with the body and other parts attached thereto (not shown), is supported on springs, not shown in the drawings, which are also connected to the axles or to the wheel mounting assemblies. The frame and body are included in the sprung mass of the vehicle. The shock absorbing or stabilizing system for the vehicle comprises a plurality of shock absorbers indicated individually at 20 which are connected at their upper and lower ends with their sprung and unsprung masses of the vehicle, respectively. As will be described in greater detail, each of the shock-absorber units 20 is connected by a conduit 23 to accumulator 22 mounted at a convenient position upon the frame of the vehicle. Connection between each of the shock absorbers and the accumulator is effected in the structure of FIG. 1 by separate conduits. The chambers 28 and 29 and conduits 23 are completely filled with hydraulic fluid.

Each shock absorber is shown in greater detail in FIG. 3. Each complete shock absorber comprises a cylinder 25 within which is a piston 26 reciprocable up and down within the cylinder and dividing the interior of the cylinder into an upper chamber 28 and a lower chamber 29. Cylinder 25 is connected at its upper end to frame member 12 in any suitable manner.

Piston 26 is connected to piston rod 27 which extends out through the lower end of cylinder 25 and is attached in any suitable manner to member 10 of the unsprung masses. Piston 26 is provided with passage 30 which extends entirely through the piston and places upper chamber 28 in unobstructed communication with lower chamber 29, permitting free transfer of fluid between the chambers in either direction at a restricted rate because of the relatively small size of passage 30. It is of course within the scope of my invention to use other means providing a passage connecting chambers 28 and 29. One such means would be a controlled annular clearance between the periphery of piston 27 and the inner surface of the wall of cylinder 25.

The upper end of cylinder 25 is connected to a hollow rod 32 which may conveniently form a portion of the means for connecting the shock absorber to frame member 12; but it will be realized that other constructions may be used. Hollow rod 32 communicates with upper chamber 28 and has at its upper end fitting 33 to which is connected conduit 23. As shown in FIG. 3, the other end of conduit 23 is connected to the base of accoumulator 22.

Accumulator 22 is a hollow vessel comprising a base 35 upon which is mounted the hollow cylindrical shell 36, the two parts being connected together by any suitable means producing a fluid-tight joint. The cylindrical shell 36 has in its piston 37 which is provided with sealing means making a fluid-tight seal with the inner wall of the shell. Thus the piston divides the interior space of the accumulator into compartment 38 above the piston and compartment 39 below the piston. Lower chamber 39 is normally filled with hydraulic fluid whereas the space 38 above the piston is filled with an elastic fluid, normally air, at some pressure above atmospheric, it being found satisfactory to operate within a range of 20–50 p.s.i. As a means for admitting gas under pressure into the upper compartment 38, the wall of shell 36 is provided with air valve 40, which may be similar in construction to the familiar tire valve. The purpose of piston 37 is primarily to separate the liquid in the lower chamber from the air or other gas in the upper chamber; and this may be done by substituting a flexible diaphragm for the piston member and in some cases it may be satisfactory to permit direction contact between the gas and the hydraulic fluid.

Base 35 of the accumulator has four parallel horizontal bores extending entirely through it. These bores each form a portion of the conduit means through which hydraulic fluid flows between shock absorbers 20 and the accumulator. Since all of these bores are alike, only one of them is shown in detail in FIG. 3. There it will be seen that the bore has a central section 42 of relatively small diameter, the bore being counter-bored at each end to provide end sections 43 and 44 of relatively larger diameter. One end section 43 is threaded or otherwise adapted to connect to the end of conduit 23 from one of the shock absorbers. The counter-bore 44 at the other end is threaded and closed by means of screw plug 45 or other means. The shoulder between the bore sections 42 and 44 forms a seat for valve disc 46 which is normally urged against the seat to close the bore to the passage of fluid by spring 48. Spring 48 is a helical spring in compression which bears at one end against valve disc 46 and at the other end against plug 45.

Valve disc 46 is mounted on a stem 49 which slides in a guide bore in plug 45 to guide the valve disc in its movement toward and away from the seat at the shoulder formed by the junction of bore 42 and counter-bore 44.

Valve 46 and the structure just described is a check-type valve since it permits fluid flow only in the direction from bore 42 into counter-bore 44 and closes to prevent fluid flow in the reverse direction. Because of spring 48, the valve opens only when fluid pressure in the bore section 42 reaches or exceeds a predetermined value; and consequently this valve is termed a relief valve since it is designed to open and relieve excess fluid pressure. To accomplish this last purpose, counter-bore 44 communicates with lower chamber 39 of the accumulator by a short vertically-extending passage 51 drilled in base 35. There are four relief valves, one for each bore.

As may be seen in FIG. 2, the base of the accumulator is also provided with four replenishing valves, one which is shown in greater detail in FIG. 3. Each of these replenishing valves comprises a hollow sleeve 53 threaded into an enlarged portion of bore 54 which places lower accumulator chamber 39 in communication with horizontal counter-bore 43. In each replenishing valve, a disc spring 55 urges a flanged valve member 56 upwardly to bring the flange on the valve body into contact with the underside of sleeve 53. In this position the valve member 56 closes the central bore extending through sleeve 53 to the passage of fluid upwardly from counter-bore 43 into accumulator chamber 39. However, spring 55 is a very light spring and yields quickly to a small differential in fluid pressure to allow valve member 56 to move downwardly, thus allowing fluid to flow out of chamber 39 and downwardly into counter-bore 43 and then into conduit 23. The valves 56 are termed replenishing valves, since, as will be further explained, they open in a direction to permit the supply of fluid in the individual shock absorbers to be replenished during the rebound stroke when, without replenishing, the total volume of fluid in the cylinder may be insufficient to fill it completely.

A manually controlled rotary valve 60 is located in the base 35 of the accumulator in a transverse bore that intersects all four of the bores 42. Rotary valve 60 is provided with a plurality of parallel, diametrically extending transverse passages 61, each of which can be brought into alignment with the sections of bore 42 in the position shown in FIG. 3 to permit fluid to flow from conduit 23 through counter-bore 43 into counter-bore 44 and thence through passage 51 into the accumulator.

At one end the valve 60 carries an operated lever 62, shown in FIG. 2. When the cylindrical valve body is rotated 90° from the position shown in FIG. 2 by means of operating lever 62, the horizontal bores 61 become vertical and the valve closes all bores 42, shutting off communication between pairs of counter-bores 43 and 44. The valve can of course be moved through an angle of less than 90° in order to effect some degree of restriction less than total upon the flow through passages 61. However, it will be noticed that whatever the degree of motion imparted to valve 60, it acts simultaneously and equally upon all four of the passages constituting part of the conduit means communicating between a shock absorber 20 and the accumulator chamber 39.

It is preferred that a very restricted flow of hydraulic fluid be possible at all times out of conduit 23 into the accumulator, even when valve 60 has been moved to a fully closed position. For this purpose it is desired to provide a by-pass which permits such limited flow of fluid past both the rotary valve 60 and the relief valve 46. Although this by-pass may be in some other location, it is convenient to provide it in the form of a small passage 65 in each of the valve members 56 of the replenishing valves.

Having described the construction of a simplified form of shock absorber system embodying my invention, its operation will now be described briefly. Assuming that valve 60 is in the open position in FIG. 3, there is direct communication between each of the four shock absorbers and the accumulator. If a load is applied to one of the shock absorbers causing cylinder 25 to move down and causing piston 26 to move up within the cylinder, the movement of the piston within the cylinder causes displacement of hydraulic fluid from upper chamber 28. This displaced fluid may leave chamber 28 either by going into lower chamber 29 through passage 30 or through tube 32 and conduit 23 to the accumulator. The descent of the cylinder causes a contraction of the volume of chamber 28 and an expansion in the volume of chamber 29. However, the upper chamber volume contracts faster than the volume of the lower chamber expands because of the introduction into the lower chamber of an additional portion of piston rod 27. The difference in the change of volumes of the two chambers represents a volume of excess liquid which is forced out of the shock absorber and is transferred to the accumulator.

On the rebound or upward stroke of cylinder 25, flow conditions are generally similar to that described except that the direction of fluid flow is reversed. However, one of the important differences is that the volume of upper chamber 28 is now expanding at a greater rate than the volume of lower chamber 29 in the cylinder is contracting so that there is actually a deficiency of hydraulic fluid in the shock absorber to fill the volume available for holding the hydraulic fluid; and this deficiency is supplied by the replenishing valve opening and allowing fluid to leave the accumulator to fill the shock absorber.

When moving in either direction very rapidly, the piston creates a zone of relatively low pressure at its retreating face. Under certain pressure conditions within the shock absorber, cavitation results at the retreating face of the piston and there is an actual void created which is not filled by fluid. This condition is caused by the inability of the fluid to fill the expanding chamber fast enough to maintain contact with the piston. Cavitation produces various undesirable results. One of them is that it tends to draw air into the system which becomes dissolved in or emulsified with the hydraulic fluid and thereby changes the action of the fluid. Also, when the direction of the piston is suddenly reversed at the end of a stroke, the piston is out of contact with the liquid at the face which is now suddenly advancing, and it moves without restraint until it again strikes the liquid in the shock absorber. This produces a shock in the system which is distinctly undesirable. The unrestrained movement of the piston represents a short period of time when actually the shock absorber is failing to control relative movement of the sprung and unsprung masses of the vehicle.

In order to avoid this effect of cavitation, there is provided super-atmospheric pressure in chamber 43 in the upper portion of the accumulator. This pressure is sufficient to force the fluid out of the accumulator and back into the piston more rapidly than is possible without such super-atmospheric pressure and as a result the effects of cavitation are greatly decreased, if not eliminated. Pressures of the order of 20–50 p.s.i are normally adequate although it may be desirable to use higher pressures under some circumstances.

Relief valves 46 result in a satisfactory shock absorber action for small or slow movements of the sprung masses, and open to permit a rapid rate of fluid flow when movements are such as to raise the fluid pressure to the predetermined value at which these valves open. A harder, stiffer ride with a greater degree of control over the range of body movement can be obtained by closing valve 60. This valve provides essentially two degrees of control, since at one position the valve is open and in the other position the valve is fully closed. However, some degree of intermediate control can be obtained by partially closing valve 60 and this effect in turn can be increased by proper design of passages 61. With valve 60 closed, fluid reaches the accumulator only through the by-passes 65; and the size of these passages now controls the degree of firmness in the ride.

The preservation of adequate shock absorber action, especially with relatively small diameters of cylinders 25, may make desirable a further relief valve shown in FIG. 5. Slow oscillation of the vehicle body produces fluid flow at a low rate. At a low enough rate, fluid can pass through by-pass 65 fast enough that the oscillation is substantially undamped or uncontrolled by the shock absorbers 20. Within limits this can be eliminated by reducing the size of passage 65, but it is unwise to reduce the cross-section of this passage too much since below a certain size it cannot permit adequate fluid flow when valve 60 is closed. With valve 60 closed, relief valve 46 is inoperative and is no longer able to prevent excessive pressure from being built up in the system. It is preferable to keep passages 65 at a safe size and to add a second relief valve to control fluid flow in each by-pass 65.

FIG. 5 shows such a valve 70 held by a light spring 71 against the upper end of by-pass 65a. The upper end of the body of replenishing valve 56 is bored out to provide a recess to receive valve 70. A perforated disc 72 acts as a guide for the stem of valve 70 and as an abutment against which spring 71 bears. Openings in the disc allow fluid to flow past. The disc may be held in place by any suitable means, as by crimping the end of the valve body over against the disc. Spring 71 is lighter than spring 48 so that valve 70 opens at a lower unit pressure in the fluid than valve 46 when valve 60 is open. When valve 60 is closed, valve 70 eliminates very low flow rates through passage 65a, yet permits the by-pass to be large enough to keep maximum fluid pressures within safe limits.

In FIG. 1 the system illustrated has a single but separate conduit 23 for each shock absorber 25, all connected to a single accumulator. This arrangement can be simplified at only a slight sacrifice in control of riding qualities by combining into one T-shaped conduit the conduits previously described for each pair of shock absorbers. In FIG. 4 there is shown a system in which the conduit 23a has two branches 23b and 23c, connected to the two shock absorbers 25 at the top of FIG. 4 which may be typically those at the front of the vehicle.

A second T-shaped conduit 23a has branches 23b and 23c connected to the two shock absorbers at the bottom of FIG. 4 which may be typically those at the rear of the vehicle. Each conduit 23a provides a single joint of connection to the accumulator for two shock absorbers.

As a consequence the accumulator 22a differs from the one shown in FIGS. 2 and 3 by having two passages in its base and likewise only two sets of relief and replenishing valves, one set for each conduit means. This is half the number in the preferred form. The accumulator 22a is the same as described above except that two passages 43, 42, 44 and their valves are omitted. The rotary valve 60 now controls fluid flow in two passages but still operates equally and simultaneously in both conduit means.

Having described my invention and certain modifications thereof, it will be apparent that further variations will occur to persons skilled in the art without departing from the spirit and scope of my invention. Consequently, it is to be understood that the foregoing description is considered to be illustrative of rather than limitative upon, the appended claims.

I claim:

1. In a hydraulic fluid-type shock absorber and ride stabilizing system for a vehicle having a plurality of double acting shock absorbers each having a cylinder and a piston reciprocable therein and dividing the interior of the cylinder into two separate chambers each filled with hydraulic fluid, and passage means extending between the two chambers of each cylinder for transfer of fluid between the two chambers at a restricted rate of flow, the combination comprising:

an accumulator;
only a single conduit means connecting each one of the cylinders at one side only of the piston therein with the accumulator to receive excess fluid from the cylinders and to replenish the cylinders;
relief valve means in each conduit means regulating flow of hydraulic fluid from the connected cylinder into the accumulator;
replenishing valve means of the check-valve type in each conduit means permitting flow of said fluid out of the accumulator to the connected cylinder;
and adjustable valve means in the conduit means movable to regulate simultaneously the flow of hydraulic fluid from all cylinders into the accumulator.

2. The combination as claimed in claim 1 in which the relief valve means opens to permit flow from a given cylinder when fluid pressure in the cylinder exceeds a predetermined value.

3. The combination as claimed in claim 1 in which the the adjustable value means comprises a single valve member movable to selected positions to restrict equally flow from all the cylinders.

4. The combination as claimed in claim 3 that also includes a by-pass continually open to permit a limited flow of fluid past the relief valve and into the accumulator.

5. The combination as claimed in claim 3 in which the adjustable valve means is located in the conduit means at a position between the relief valve means and the replenishing valve means.

6. In a hydraulic fluid-type shock absorber and ride stabilizing system for a vehicle having a plurality of double acting shock absorbers each having a cylinder and a piston reciprocable therein and dividing the interior of the cylinder into two separate chambers each filled with hydraulic fluid, and passage means extending between the two chambers of each cylinder for transfer of fluid between the two chambers at a restricted rate of flow, the combination comprising:

an accumulator;
only a single conduit connecting each of the cylinders at one side only of the piston therein to the accumulator to receive excess fluid from the associated cylinder and to replenish fluid supply in the cylinder;
a plurality of replenishing valves of the check-valve type each permitting flow of said fluid out of the accumulator to one of the cylinders;
and adjustable valve means movable to regulate simultaneously the flow of hydraulic fluid from all cylinders into the accumulator.

7. In a hydraulic fluid-type shock absorber and ride stabilizing system for a vehicle having a pair of double acting shock absorbers located one at each side of the vehicle and each having a cylinder and a piston reciprocable therein and dividing the interior of the cylinder into two separate chambers each filled with hydraulic fluid, and passage means etxending between the two chambers of each cylinder for transfer of fluid between the two chambers at a restricted rate of flow, the combination comprising:

an accumulator;
only a single conduit means connected to the accumulator and having two branches connected one to each of the pair of cylinders to transfer hydraulic fluid between the accumulator and the cylinders, each branch being connected to one cylinder at only one side of the piston therein;
a single replenishing valve of the check-valve type in the conduit means permitting flow of said fluid out of the accumulator to both the cylinders;
and adjustable valve means movable to regulate simultaneously the flow of hydraulic fluid from both cylinders into the accumulator.

8. In a hydraulic fluid-type shock absorber and ride stabilizing system for a vehicle having a plurailty of double acting shock absorbers arranged in pairs with the shock absorbers of each pair located one at each side of the vehicle and each having a cylinder and a piston reciprocable therein and dividing the interior of the cylinder into two separate chambers each filled with hydraulic fluid, and passage means extending between the two chambers of each cylinder for transfer of fluid between the two chambers at a restricted rate of flow, the combination comprising:

an accumulator;
separate conduit means for each pair of shock absorbers connected to the accumulator and having two branches connected one to each cylinder of the associated pair of shock absorbers to transfer hydraulic fluid between the accumulator and the cylinders, each of said branches being connected to only one cylinder at only one side of the piston therein;
a single relief valve in each conduit means regulating flow of hydraulic fluid from both cylinders of the associated pair of shock absorbers into the accumulator;
a single replenishing valve of the check-valve type in each conduit means permitting flow of said fluid out of the accumulator to both the cylinders of the associated pair of shock absorbers;
and adjustable valve means movable to regulate simultaneously the flow of hydraulic fluid from all cylinders into the accumulator.

9. In a hydraulic fluid-type shock absorber and ride stabilizing system for a vehicle having a plurality of double acting shock absorbers each having a cylinder and a piston reciprocable therein and dividing the interior of the cylinder into two separate chambers each filled with hydraulic fluid, and passage means extending between the two chambers of each cylinder for transfer of fluid between the two chambers at a restricted rate of flow, the combination comprising:

an accumulator;
 only a single conduit connecting each of the cylinders at one side only of the piston therein to the accumulator to receive excess fluid from the associated cylinder and to replenish fluid supply in the cylinder;
 a plurality of replenishing valves of the check-valve type each permitting flow of said fluid out of the accumulator to one of the cylinders;
 and a by-pass communicating with each conduit and the accumulator around each replenishing valve, said by-pass being continually open and relatively restricted in size to permit only limited fluid flow past the replenishing valve and into the accumulator.

10. The combination as claimed in claim 9 in which each conduit is connected to one cylinder in direct communication with the chamber therein which is reduced in size by the initial compression stroke of the piston.

References Cited in the file of this patent

UNITED STATES PATENTS

| | | |
|---|---|---|
| 1,957,658 | Logan | May 8, 1934 |
| 2,013,920 | Kulick | Sept. 10, 1935 |
| 2,065,832 | Spyker | Dec. 29, 1936 |
| 2,812,954 | Lyon | Nov. 12, 1957 |
| 2,980,440 | Walker | Apr. 18, 1961 |